Sept. 8, 1942.  T. A. FEDERWITZ  2,295,461
APPARATUS FOR FEEDING AND BENDING BOX BLANKS
Filed June 4, 1940  8 Sheets-Sheet 1

INVENTOR
THEODORE A. FEDERWITZ
Cornelius D. Ehret
ATTORNEY

Sept. 8, 1942. T. A. FEDERWITZ 2,295,461
APPARATUS FOR FEEDING AND BENDING BOX BLANKS
Filed June 4, 1940 8 Sheets-Sheet 2
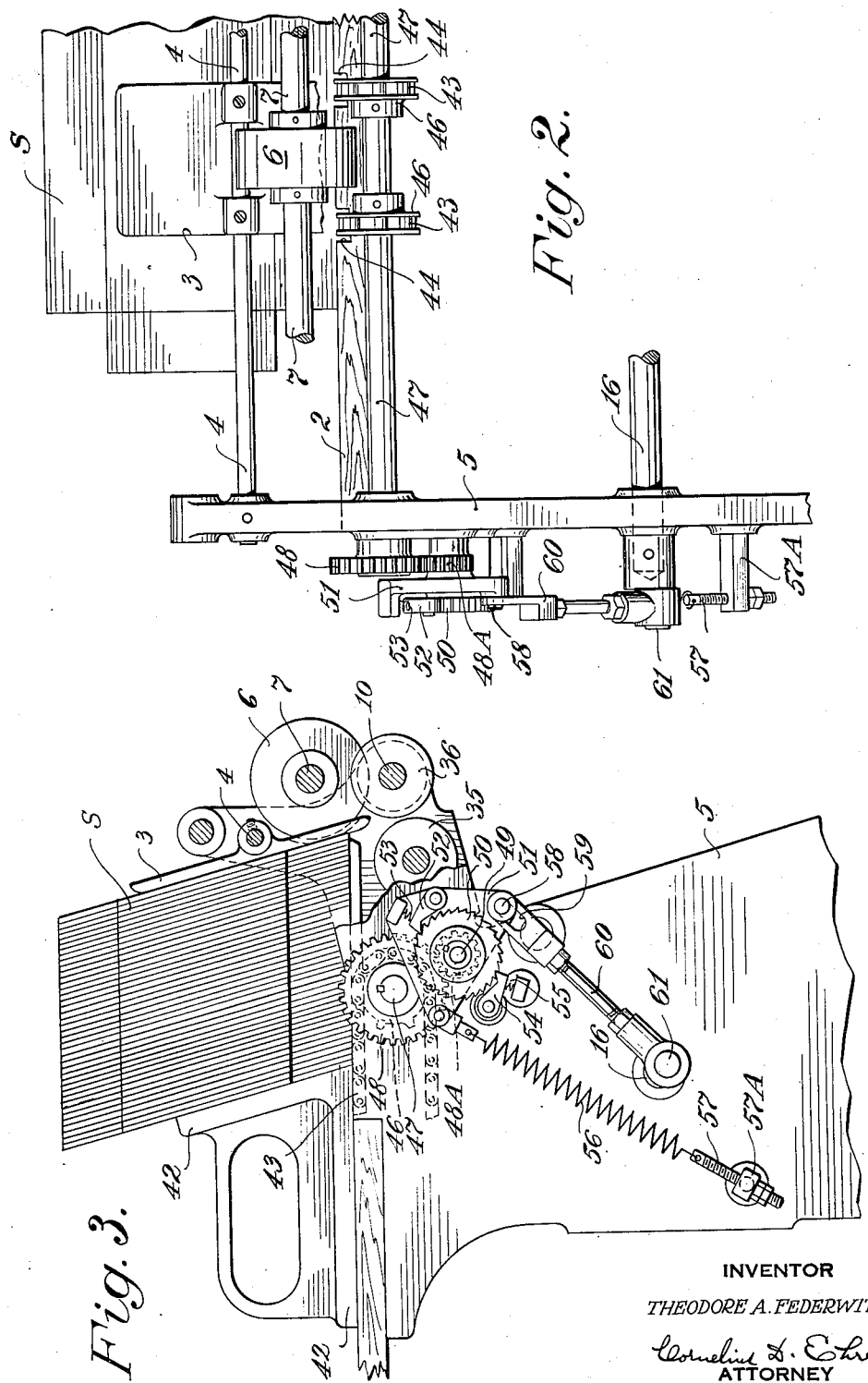
INVENTOR
THEODORE A. FEDERWITZ
ATTORNEY Sept. 8, 1942. T. A. FEDERWITZ 2,295,461
APPARATUS FOR FEEDING AND BENDING BOX BLANKS
Filed June 4, 1940 8 Sheets-Sheet 3
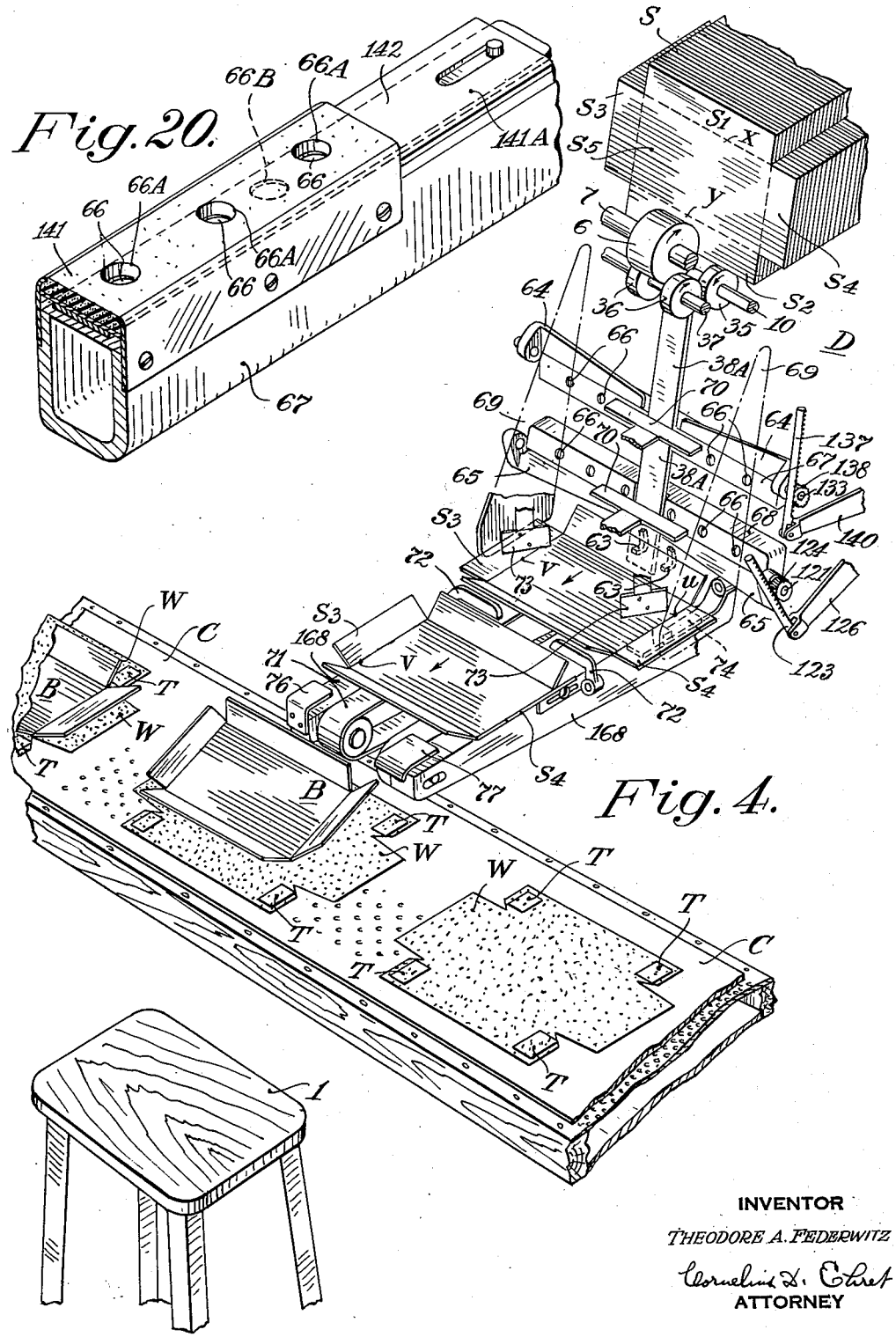
INVENTOR
THEODORE A. FEDERWITZ
ATTORNEY Sept. 8, 1942.   T. A. FEDERWITZ   2,295,461
APPARATUS FOR FEEDING AND BENDING BOX BLANKS
Filed June 4, 1940   8 Sheets-Sheet 4
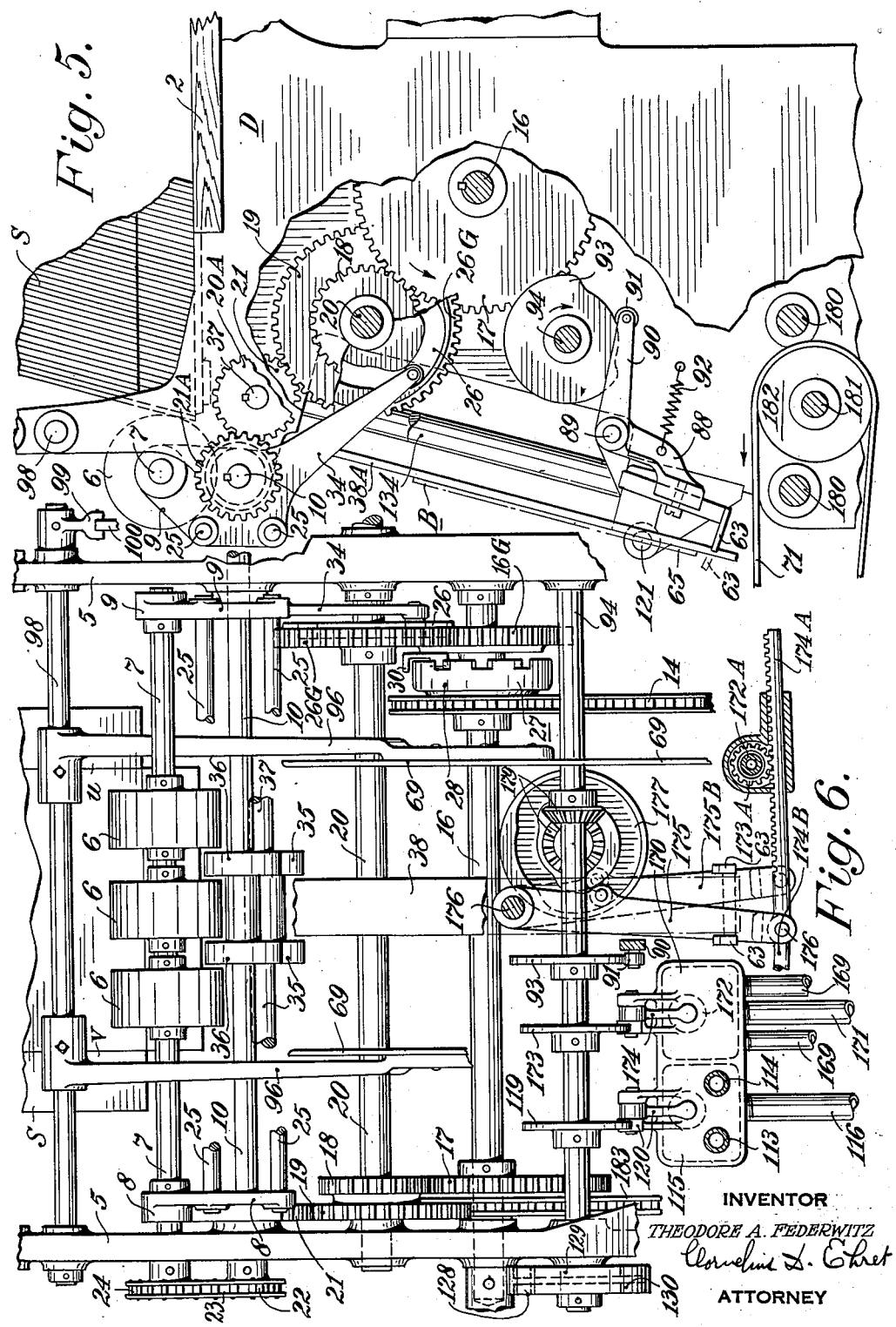
INVENTOR
THEODORE A. FEDERWITZ
ATTORNEY

INVENTOR
THEODORE A. FEDERWITZ
ATTORNEY

Sept. 8, 1942.  T. A. FEDERWITZ  2,295,461
APPARATUS FOR FEEDING AND BENDING BOX BLANKS
Filed June 4, 1940  8 Sheets-Sheet 6
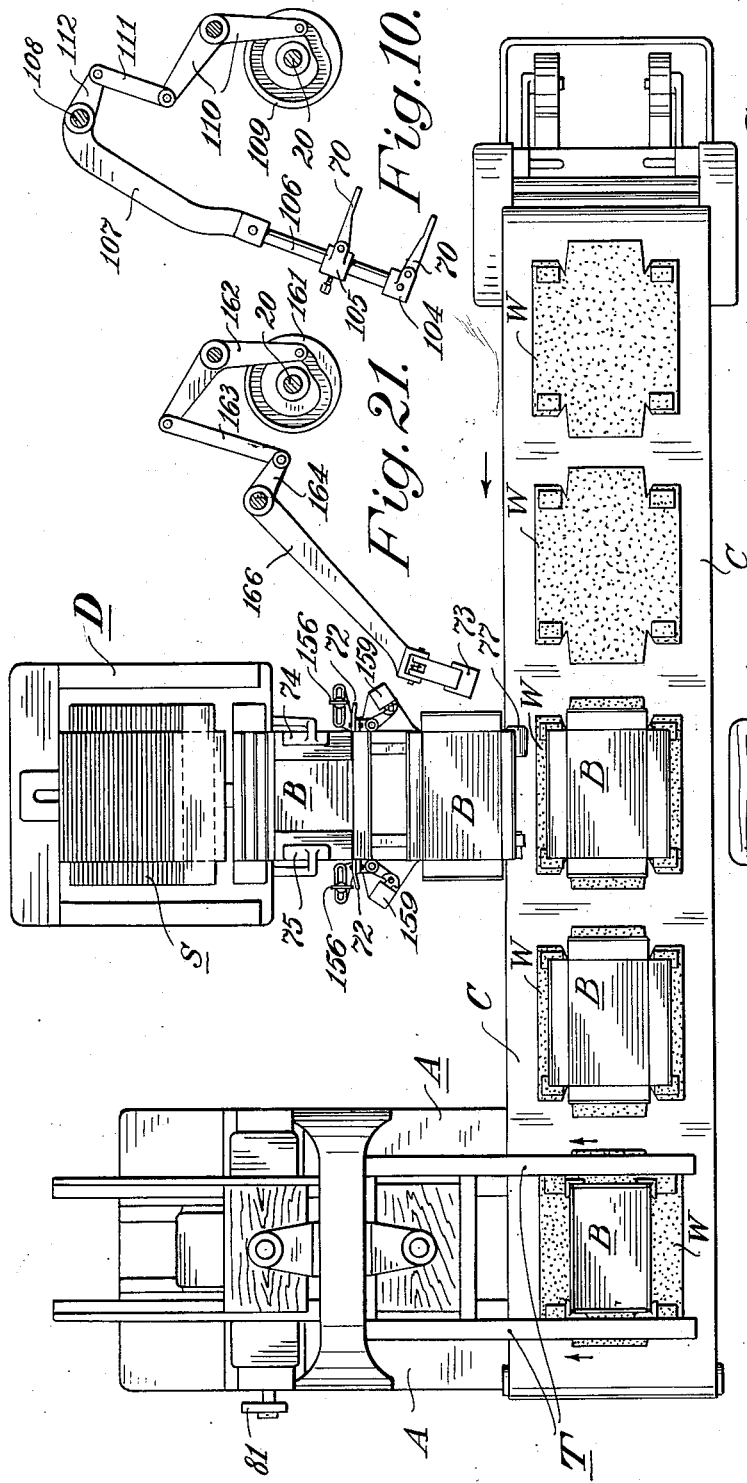
INVENTOR
THEODORE A. FEDERWITZ
Cornelius D. Ehret
ATTORNEY

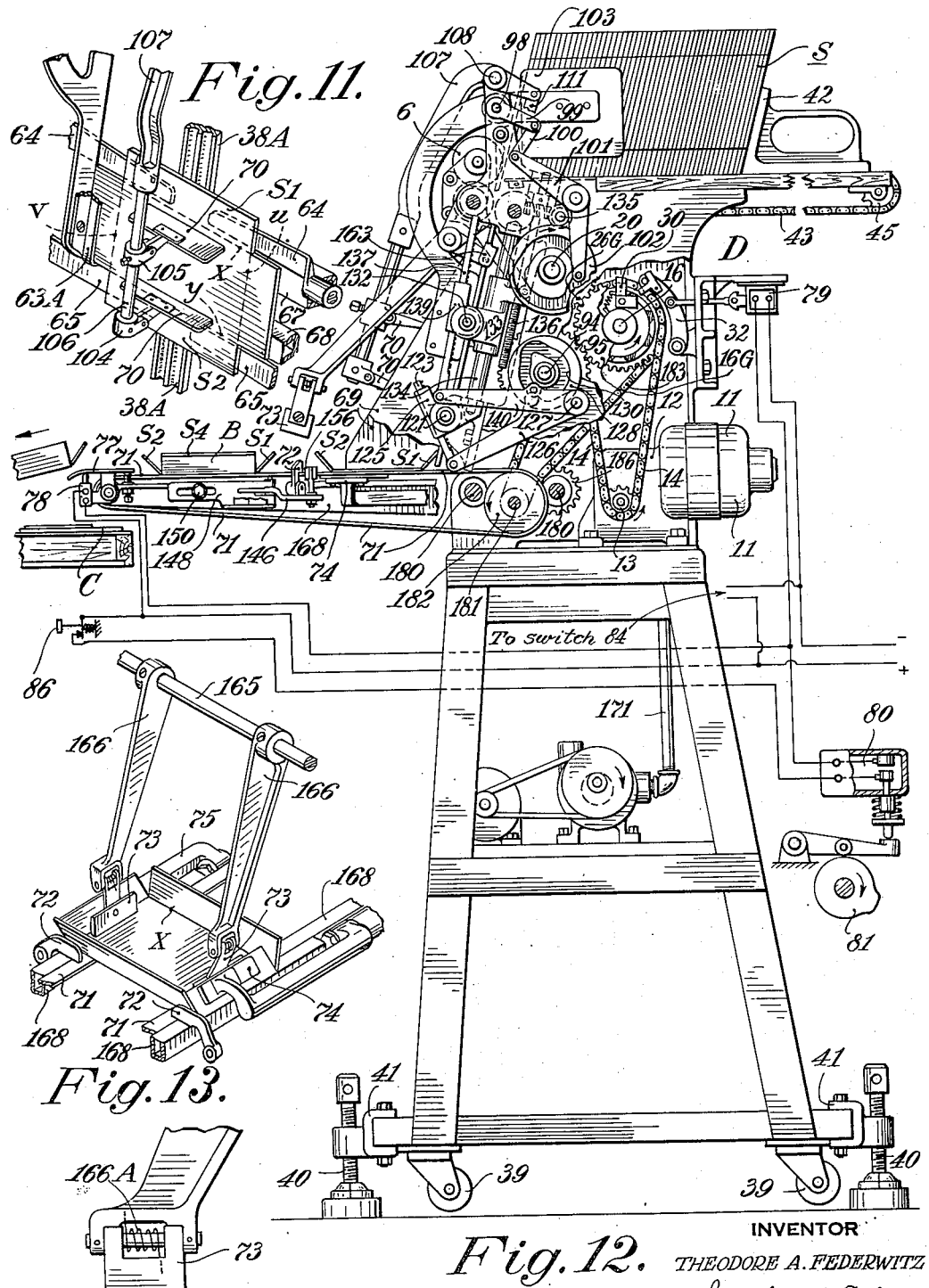

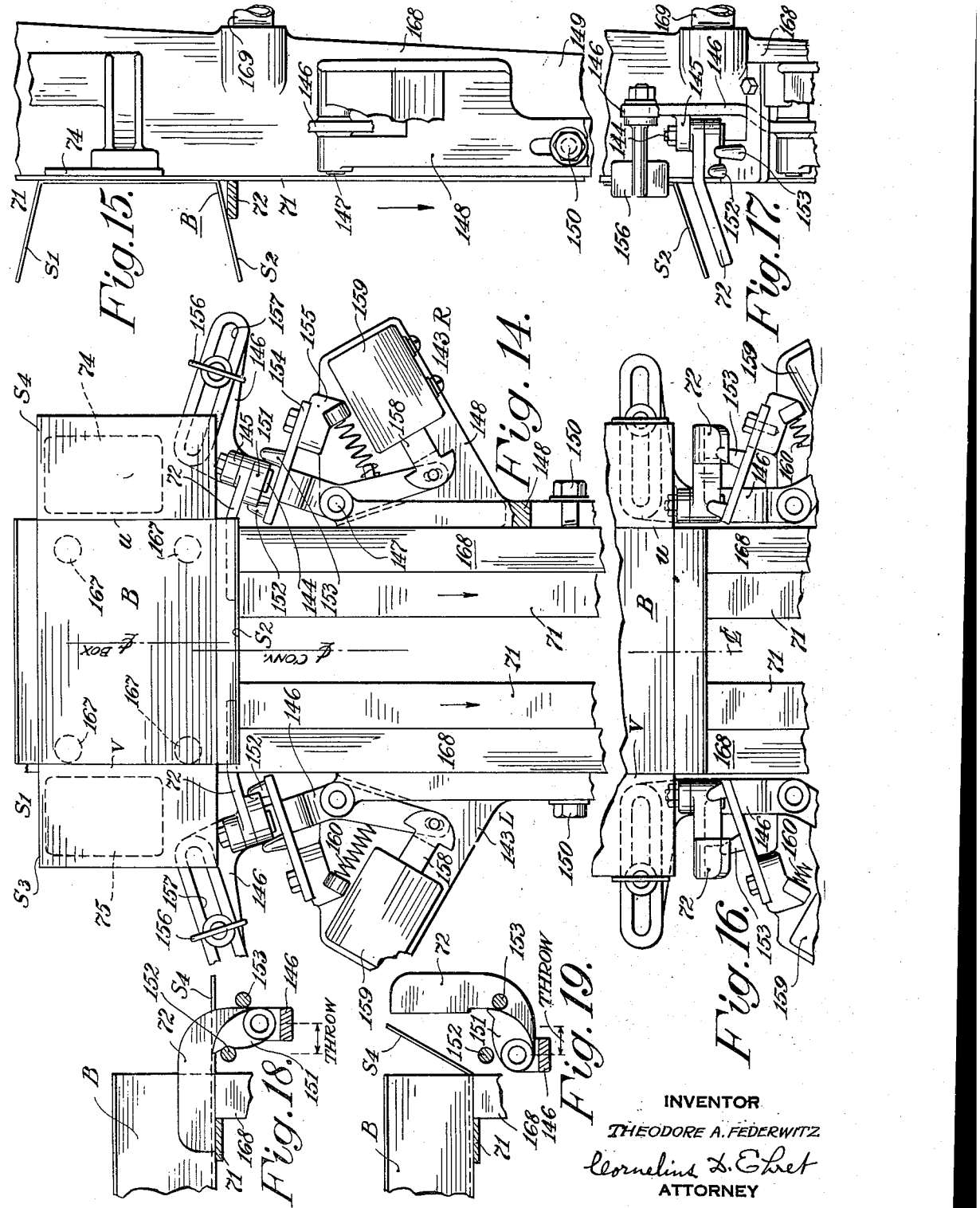

Patented Sept. 8, 1942

2,295,461

UNITED STATES PATENT OFFICE 2,295,461

APPARATUS FOR FEEDING AND BENDING BOX BLANKS

Theodore A. Federwitz, Philadelphia, Pa., assignor to Stokes and Smith Company, Summerdale, Philadelphia, Pa., a corporation of Pennsylvania Application June 4, 1940, Serial No. 338,694

10 Claims. (Cl. 93—49)

My invention relates to apparatus for feeding box blanks from a stack or equivalent source of supply, bending them, and delivering them individually to a desired destination; my invention is broadly utilizable wherever suitable and is not limited in its application to systems such as herein disclosed; it may be used alone or with various types and systems of box wrapping machines, staying machines, etc.

In accordance with one aspect of my invention, while a scored box blank, intermittently advanced by suitable mechanism, is at rest, a bending tool, preferably rotatable about an axis in substantial alignment with a score line of the blank, sharply bends a panel of the blank with respect to another panel; more particularly, to preclude movement of the blank during bending of a panel and to ensure the bending occurs at the score line, the blank is, adjacent the score line, held by a tool which yields to the bending tool only after the panel has been swung through a substantial and predetermined angle.

Further in accordance with my invention, after a box blank has been fed to a bending station, it is automatically shifted, if necessary, to effect aforesaid alignment of the bending tool, prior to operation thereof, with the score line.

My invention resides in mechanism having further features hereinafter described and claimed.

For an understanding of my invention, reference is to be had to the accompanying drawings in which:

Fig. 2 is a front elevational view, on enlarged scale, of parts appearing in Fig. 1;

Fig. 3 is a side elevational view of stack-feeding mechanism shown in Fig. 2;

Figure 4A:
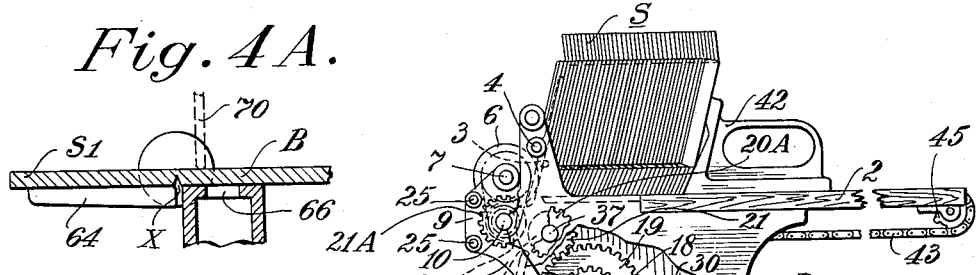
Figure 4B:
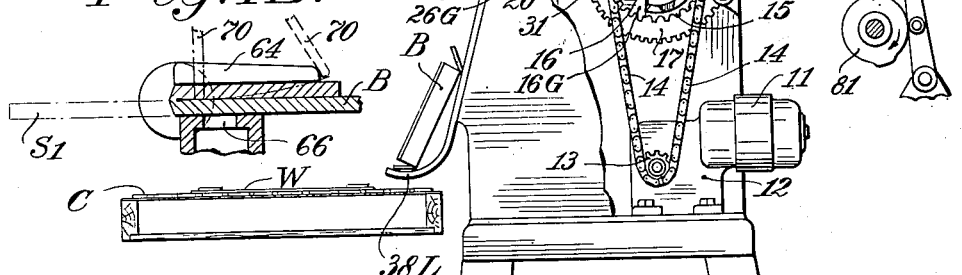
Figure 1:
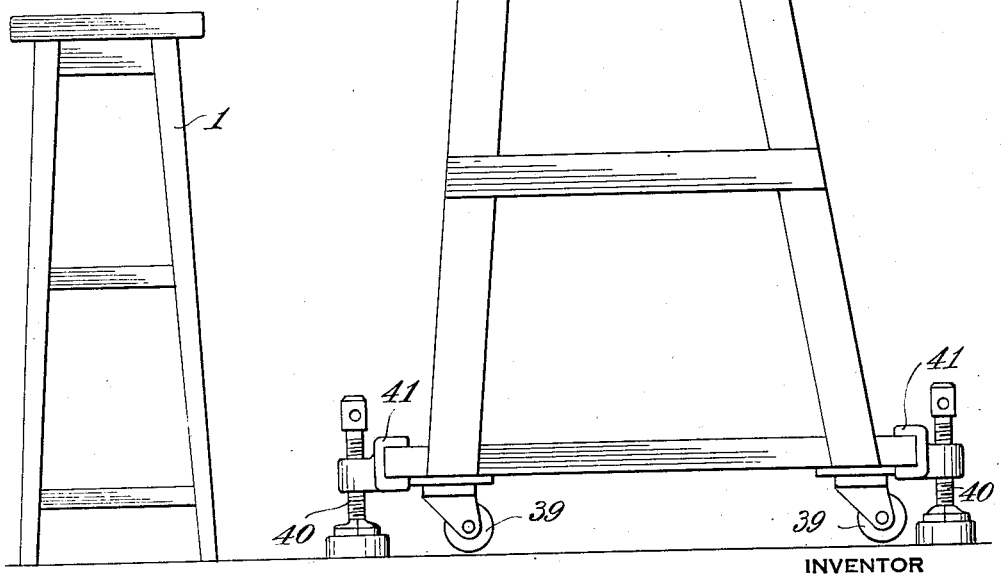
Fig. 1 is a side elevational view, with parts broken away, of a blank-feeding machine in association with other elements of a box-making system.
Figures 7, 8, 9:
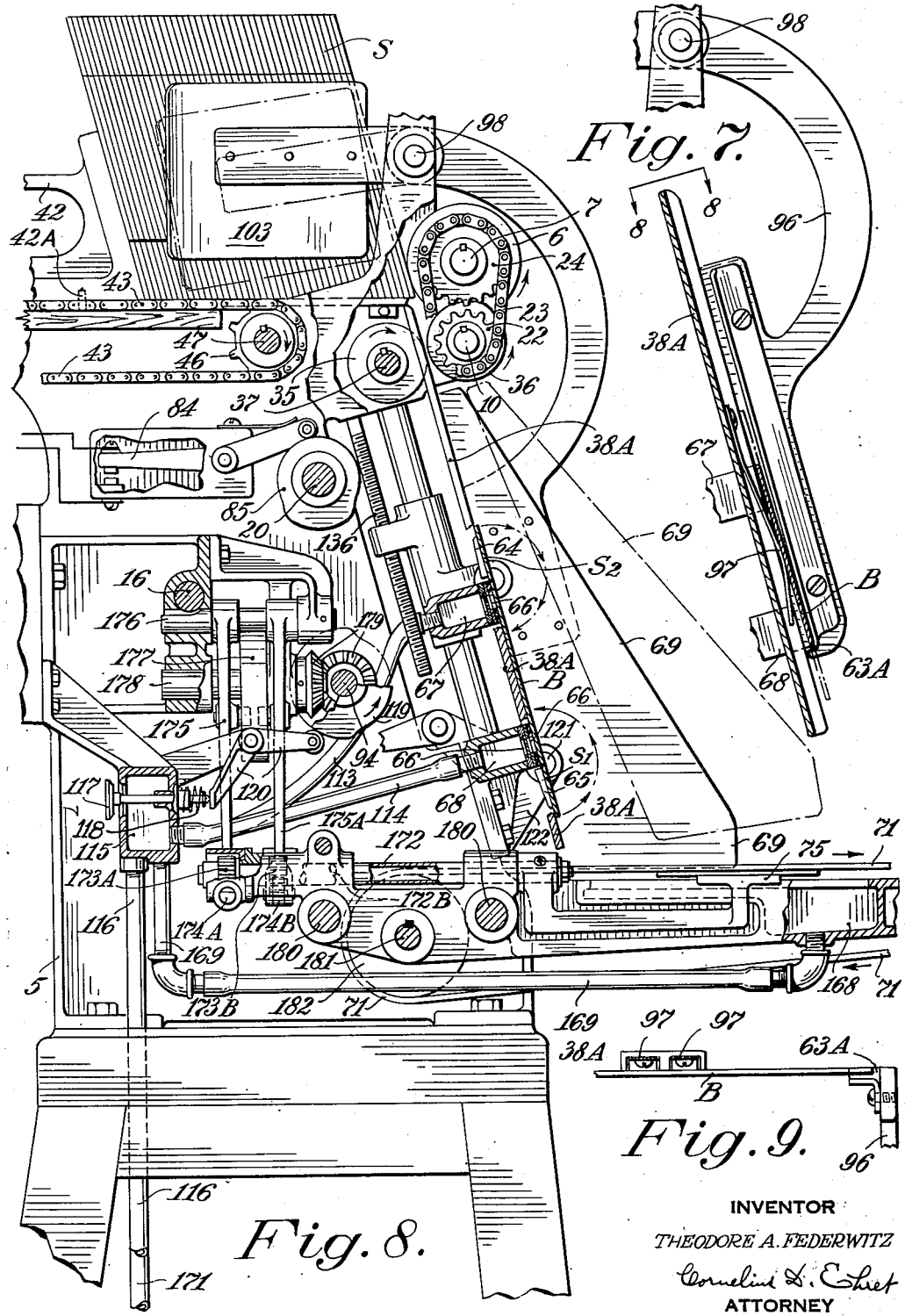

Fig. 4, in perspective, illustrates significant elements of a modification of the mechanism shown in Figs. 1–3;

Figs. 4A and 4B are explanatory figures referred to in description of blank-bending mechanism shown in Fig. 4;

Fig. 5, on enlarged scale, is a side elevational view, partly in section and with parts broken away, of operating mechanism for elements shown in Fig. 4;

Fig. 6 is a front elevational view, with parts broken away and with parts in section, of the modification shown in Figs. 4 and 5;

Fig. 7, partly in section, is a side elevational view of a modified form of stop mechanism;

Fig. 8 is a side elevational view, with parts in section, and with parts broken away, of the blank-feeding and bending mechanism of Figs. 4 to 6;

Fig. 9 is a detail view, in plan, of parts shown in Fig. 8;

Fig. 10 is a view, in side elevation, of the operating mechanism for the blank-holding device shown in Fig. 4;

Fig. 11, in perspective, illustrates the relations of the stop of Fig. 7 and the holding device of Fig. 10 with respect to each other and the blank-bending devices;

Fig. 12 is a side elevational view, with parts omitted and parts in section, of the blank-feeding and bending mechanism of Fig. 4;

Fig. 13, in perspective, illustrates the relation to each other of blank-bending and holding mechanisms shown in Fig. 12;

Fig. 14, on enlarged scale, is a plan view of blank-bending and centering mechanism shown in Fig. 12;

Fig. 15 is an end view of the parts appearing in Fig. 14;

Fig. 16 is similar to Fig. 14 which shows the parts in a different operating position;

Fig. 17 is an end view of parts appearing in Fig. 16;

Fig. 18 is a fragmentary view, in front elevation, of stop structure shown in Figs. 14–17;

Fig. 19 is similar to Fig. 18, but shows the stop structure in another of its significant positions;

Fig. 20, in perspective, and on enlarged scale, illustrates the construction of a suction device for holding the blanks during their bending;

Fig. 21 is a detail view, in end elevation, of the operating mechanism for a blank-holding device shown in Figs. 12 and 13;

Fig. 22 is a detail view of the mounting for the blank-holding tools of Figs. 11 and 13;

Fig. 23 is a plan view of a complete box-making system including the blank-feeding and bending apparatus of Figs. 4–22.

Referring to Figs. 1, 2, 3 and 23, the conveyor C transports wrappers W, for example, which have been coated with adhesive by the adhesive-applying mechanism G, to the sheet-applying mechanism A which applies the wrappers to box blanks which have been registered upon them to form assemblies by an operator stationed adjacent the conveyor, for example, seated upon the stool I at or adjacent the assembly station.

The wrapping machine A may be of any suitable type, for example, the double-plunger type shown in Bailey Patent 2,119,980, to which the assemblies comprising the blanks and partially applied sheet material are automatically transferred from the conveyor C by any suitable transfer device T such as shown, for example, in Lange et al. Patent 2,144,764 or in copending application Serial No. 314,375, Bailey. The adhesive-applying mechanism G may be of any suitable type; for example, it may be similar to that disclosed in Davis Patent 1,818,198; if the wrappers are to be tabbed, or if tabs alone are to be fed without wrappers, the mechanism G may be of the type disclosed in Rider Patent 1,806,181. For each cycle of operation of the sheet-applying mechanism A, a wrapper is coated with adhesive by mechanism G and delivered to conveyor C, a coated wrapper is delivered by conveyor C to the assembly station in front of the operator, the operator transfers a box blank from another station adjacent the assembly station onto a wrapper at the assembly station, transfer device T moves an assembly from conveyor C to mechanism A, and mechanism A operates upon an assembly to convert it into a wrapped box.

The above described system as a whole and modifications thereof, disclosed and claimed in the co-pending application of John S. Stokes Serial No. 422,197, filed December 9, 1941, are merely exemplary of numerous other applications, fields and relations for and in which my present invention is utilizable.

The stack S of pre-bent blanks is disposed upon the top plate or frame member 2 of the blank-feeding mechanism D with the front blank of the stack against the inclined plate 3 attached to the tie rod 4 extending between the frame members 5 of the mechanism. The blank-separating roll 6 is attached to the shaft 7 supported at its opposite ends by oscillatable arms 8, 9, Fig. 6, loosely mounted upon the shaft 10 extending between side frames 5, 5. The shaft 7 is continuously rotated by the motor 11, or equivalent, through the train of mechanism, Figs. 1, 5 and 6, comprising reduction gearing 12, sprocket 13, chain 14, sprocket 15, shaft 16, gear 17, gear unit 18, 19 free to rotate upon shaft 20, gear 21, gears 20A and 21A, shaft 10, sprocket 22 attached to shaft 10, chain 23, and sprocket 24 attached to shaft 7.

The roll or rolls 6, mounted as aforesaid upon arms 8 and 9, connected by tie rods 25, 25, are intermittently moved toward and away from the front blank of the stack under control of the cam 26, Figs. 1, 5, 6, integral with gear 26G attached to shaft 20 which is driven from the continuously rotating shaft 16 through the one-cycle clutch 27 comprising the driving clutch member 28 attached to shaft 16 and the driven clutch member 29 supported upon but free to rotate with respect to shaft 16 and upon which is pivotally mounted the clutch pawl or dog 30 biased by spring 31 to engage the teeth of the driven clutch member 28 and restrained from such engagement by the latch 32, Fig. 1. When the latch is released by movement of arm 82 to the right from the position shown in Fig. 1, the dog 30 is moved by spring 31 into one of the notches of the continuously rotating driven clutch member 28 and remains in such engagement to effect rotation of shaft 20 through gears 16G, 26G, Fig. 1, until near the end of a revolution when the dog, because then coming into engagement with latch member 32, is swung about its pivot and out of engagement with the driven clutch member 29.

Shaft 20 thereupon stops and remains at rest until the clutch dog 30 is again released to initiate another cycle. During each revolution of shaft 20, corresponding with one cycle of mechanism D, the cam 26, by its engagement with the cam follower 33 on the extension 34 of arm 9, rocks the frame comprising arms 8 and 9 to effect engagement of roll 6 with the front blank of the stack and feed it downwardly for engagement by the continuously rotating feed rolls 35, 36, the latter attached to shaft 10 and the former to shaft 37. The blank so separated from the stack slides down the inclined plate 38, having at its lower end a ledge 38L extending over the conveyor C toward the operator and terminating short of the assembly station. The operator removes the blank from the ledge and registers it upon a wrapper before her upon the conveyor C thus to form an assembly convertible by mechanism A into a wrapped box.

The blank-bending unit D is so located that the box blank when upon ledge 38L is substantially in alignment with a wrapper on conveyor C while at rest after one of its stepping movements; moreover, the orientation of the blanks upon arrival at the ledge or transfer station preferably corresponds with the orientation of the wrappers at the assembly station; i. e. in the particular example shown in Fig. 23, the short sides or ends of the box blanks and wrappers extend substantially at right angles to the direction of movement of conveyor C, and the long sides of the blanks and wrappers extend parallel to the direction of movement of conveyor C. Consequently, the operator, upon removing a box blank from the delivery end of slide 38, need do no more than move the box blank toward her and thence downwardly upon the wrapper. The unit D may be provided with castors 39 to facilitate its movement, with respect to conveyor C, to desired position adjacent the assembly station. The unit may be lifted from the floor, when properly relocated, by the standards 40 in continuous threaded engagement with the frame extensions or brackets 41.

The front end of the stack S is maintained against the plate 3, in proper position for removal of the blanks by roll 6, by the stack-feeding mechanism shown in Figs. 2 and 3. The weight or block 42 which engages the rear of the stack rests upon, or is provided with, pins 42A (Fig. 8) which detachably engage the chains 43, 43 received by guide grooves 44 (Fig. 2) in the upper face of the plate member or support 2. The chains pass over idler sprockets 45 at the rear of unit D and over driving sprockets 46 attached to shaft 47 near the front of the unit. The gear 48, attached to the left-hand end of shaft 47, Fig. 2, is in mesh with the gear 48A attached to the shaft 49 to which the ratchet 50 is attached and upon which the frame 51 is free to oscillate. The driving pawl 52 supported upon frame 51 is maintained in engagement with the ratchet 50 by spring 53. The locking pawl 54 is pivotally mounted upon one of the frame members 5 and is biased into engagement with the ratchet 50 by spring 55. The spring 56 is connected at its upper end to the frame 51 and at its lower end to the adjustable threaded member 57 extending through the standard 57A secured to the side frame 5. The pin 58 extending outwardly from the oscillatable frame 51 is slidable in the slot 59 of a link or arm 60 whose lower end fits the crank pin 61 on shaft 16.

When removal of one or more blanks from the stack permits the spring 56 to rotate the frame 51 in counterclockwise direction about shaft 49 to extent sufficient to cause engagement of pin 58 with the upper end of the slot 59, the crank 60 is effective during its next down stroke to swing the frame 51 in clockwise direction against the bias of spring 56 to such extent the pawl 52 rides over one or more teeth of the ratchet 50 so that, in the next upstroke of the crank, the spring 56 effects, through pawl 52, ratchet 50 and shaft 47, a feeding movement of the stack-supporting block 42. When the stack has been fed sufficiently to restore engagement of its forward end with plate 3, the feeding movement ceases because, during further reciprocations of the crank 60, the pin 58 is not engaged by the upper end of slot 59.

The blanks fed from the stack S are pre-scored and preferably are also pre-bent particularly when, because of the dimensions of the blanks or of the stiffness of the material comprising them, there is a decided tendency for the sides of the finished boxes to bow outwardly.

The modifications of my invention disclosed in the subsequent figures, and with which the remaining description is concerned, includes the blank-removing and stack-feeding mechanism of Figs. 1 to 3 and, in addition, includes mechanism for automatically bending each blank, along its scoring, after it has been removed from the stack S, and before it is applied by the operator to a wrapper.

Referring to Figs. 4 and 5, each blank removed from the stack S by the transfer roll 6 and feed rolls 35, 36 is arrested by the stops 63 so located that the score line $x$ is substantially in alignment with the pivotal axis of the upper pair of side bending plates 64, 64, and that the score line $y$ is substantially in alignment with the pivotal axis of the lower pair of side bending plates 65, 65. The blank B is preferably held during the bending, by the aforesaid pairs of bending plates, of its side panels S1, S2 by suction exerted through the ports 66 in the front faces of the suction housings 67, 68, Figs. 4, 8, 11 and 20. To insure proper positioning of the blank for aforesaid bending and to prevent its displacement during the bending, there are provided the guides 69, 69 for engaging the vertical edges of panels S3, S4 of the blank and plates 70, 70 disposed to engage the outer face of the blank adjacent its score lines $x$, $y$, Figs. 4 and 11.

As hereinafter more fully explained, the upper and lower pairs of said bending tools preferably operate nonconcurrently or out of phase so to avoid interference between them or the panels when the width of the bottom panel S5 of the blank is less than twice the width of the side panels or depth of the box.

The relation of the pivotal axis of the bending tools 64 to the scoring $x$, and of the blade 70 with respect thereto, is more clearly shown in Figs. 4A and 4B. Before bending of the blank, the blade 70 is substantially normal to that face of the blank destined to be the inside of the box and engages that face in line with the axis of rotation of the bending tool and with the scoring of the opposite face of the blank. As the bending tool 64 swings about its axis, the tool 70 remains in the position shown in Fig. 4A until panel S1 has been swung through a quarter revolution and then yields as panel S is swung through the remainder of a full half revolution into face-to-face engagement with the bottom panel of the blank B, Fig. 4B. There is thus insured a sharp bend along a definitely predetermined line.

Similarly, the lower side panel S2 of the blank is bent sharply into face to face engagement with the bottom panel of blank B by coaction of bending tools 65, 65 and lower holding tool 70.

Subsequently, in the operation of the machine, the blank, released from stop 63 and from suction through the ports 66, falls upon the continuously operating conveyor belts 71, Fig. 4, and moves with them until temporarily arrested by the stops 72, 72 with which is associated, as hereinafter more fully explained, mechanism for centering the blank before it is engaged by the hold-down blades 73, 73 and before operation of the end-bending tools 74, 75, the former having its axis of rotation substantially in alignment with the score line $u$ and the latter having its axis of rotation in substantial alignment with the score line $v$. The two bending tools 74, 75 preferably operate non-concurrently to avoid interference between them or end panels S3, S4 when the length of the bottom panel S5 of the blank is less than twice the height of an end panel. The relations of the axes of the end-bending tools 74, 75 to the score lines $u$, $v$ and to the holding tools 73 are the same as shown in Figs. 4A and 4B between side-bending tool 64, score line $x$ and side-holding tool 70.

Each blank, after completion of the bending of its end panels, is released from stops 72, 72 for further movement with conveyor belts 71, 71, until arrested by the stops 76, 77 in predetermined desired orientation at the station or point, short of the assembly station, from which it is, for example, transferred by the operator into registering engagement with a wrapper or group of tabs at the assembly station on conveyor C. Stop 77 may be pivotally mounted to serve, when rocked by the operator concurrently with removal of a bent blank, as an operating member for switch 78 in circuit with a solenoid 79, Fig. 12, whose movable core member is suitably mechanically connected to the latch 32 of the one-cycle clutch 27 of the blank-feeding unit. Energization of solenoid 79 is also under control of the switch 80, intermittently closed by the cam 81 included in, and which makes one revolution for each cycle of, the sheet-applying mechanism A. The normally closed switch 86 in series with switch 80 may be opened by the operator when it is desired to interrupt feed of blanks from stack S and yet continue operation of the wrapping machine until all assemblies on conveyor C have been converted into boxes. In the normal operation of the system, for each cycle of the wrapping machine, the blank-feeding mechanism D is tripped to initiate each cycle either by operation of switch 80, by cam 81 of the wrapping machine, or by actuation of switch 78 by the operator in removal of a blank from mechanism D.

This same arrangement of switches 80, 86, cam 81 and solenoid 79 shown in Fig. 12, may be utilized in the modification shown in Fig. 1 instead of the mechanical arrangement shown in Fig. 1, in which cam 81 of the sheet-applying mechanism A is mechanically coupled to latch 32 by the arm 82 and link 83 to synchronize the feeding of blanks to the operator with the production of boxes by mechanism A.

The stops 63, Fig. 5, which arrest the blanks for operation thereon of the side-bending tools 64, 65 are attached to members 87 adjustably attached to arms 88 secured to shaft 89 from which extends arm 90 carrying roller 91. Spring 92 biases shaft 89 to maintain engagement between roller 91 and cam 93 secured to shaft 94 driven from shaft 16 by gears 16G and 95.

Stops 63 may be replaced by stops 63A, Figs. 7, 8, 9 and 11 attached to guides 69. As shown most clearly in Fig. 7, stop 63A is the inwardly turned end of an L-shaped member attached to arm 96 of the corresponding side guide 69. The leaf springs 97 within recesses in the front face of member 38A deflect the falling blank to engage the stops. These springs are overcome by the suction exerted upon the blank through ports 66 of housings 67 and 68 before and during operation of the bending tools 64, 65. The suction is cut off after the bending is completed and arms 96 have been swung away from the blank, whereupon the springs 97 push the blank away from member 38A and so insure it is not unduly retarded in its fall onto belts 71.

The arms 96 are adjustably attached to shaft 98, Figs. 6, 8 and 12, to which is secured arm 99, Fig. 12, connected by link 100 to one arm of a bell crank lever 101 whose other arm carries a follower received by the cam groove of cam 102 on shaft 20 which, as previously stated, rotates one revolution for each cycle of machine B. Cam 102 is so shaped and timed that the guides 69 and stop 63 move to the position shown in Fig. 8 in advance of release of a blank from feed rolls 35, 36 and remain in that position until after the sides of the blank have been bent by tools 64, 65.

The arms 96 are adjustable toward and from each other along shaft 98 to accommodate blanks of various overall lengths.

Preferably to arms 96 are also attached the plates 103 which engage opposite sides of the stack S of blanks. The oscillation of these plates during operation of the machine loosens the blanks and so facilitates their individual separation from the stack by roller 6.

The plates 70 which hold a blank during bending of its side panels are pivotally supported upon collars 104, 105, the former permanently and latter adjustably attached to bar 106 depending from arm 107 which is attached to shaft 108, Figs. 10 and 12. The cam groove of cam 109 on shaft 20 receives a follower carried by one arm of bell crank lever 110 whose other arm is connected by link 111 to arm 112 attached to shaft 108 thus to effect, for each cycle of the machine, movement of plates 70 toward and from a blank arrested by stops 63 or 63A. Plates 70 are biased by springs, not shown, to the positions shown in Figs. 10 and 11 and yield, as shown in Fig. 4B and as above described, for movement toward each other during operation of bending tools 64, 65. Cam 109 is so shaped and timed that plates 70 move to their holding position after a blank has been arrested by stops 63A, and remain in that position until after the sides of the blank have been bent by tools 64, 65.

Referring to Figs. 6 and 8, the suction chambers 67 and 68 are connected by pipes 113, 114 to suction chamber 115 connected as by pipe 116 to a suction pump or equivalent. The bleeder valve 117, biased to closed position by spring 118, is controlled by cam 119 on shaft 94 through the bell crank lever 120. Cam 119 is so shaped that suction is exerted on a blank after it has been engaged by plates 70 and remains on until after they have moved away from the blank subsequent to its bending by tools 64, 65.

Preferably, as shown in Fig. 20, the suction housing 67 is provided on each side of center with a plurality of ports 66 in alignment with corresponding ports 66A in member 141 overlying the apertured face of housing 67 and preferably of rubber or the like vulcanized or otherwise attached to plate or sheet-metal strip 141A. The slide 142 between the adjacent faces of housing 67 and strip 141A has one or more holes 66B which by adjustment of the slide permits suction to be exerted upon the blank through a selected one or group of ports 66A. Housing 68 is or may be similarly constructed.

The lower side bending tools 65, 65 are attached to shaft 121, Figs. 4, 8 and 12, journalled in brackets 122 attached to the frame of the machine. The rack 123 continuously in mesh with gear 124 on shaft 121 is guided by member 125 suitably attached to the frame. The lower end of rack 123 is pivotally connected to lever 126 pivoted at 127 to the frame 5 and carrying a follower received by a cam groove 129, Fig. 6, of cam 128 attached to shaft 94.

The upper pair of side bending tools 64, 64 are attached to shaft 132 journalled in blocks 133 slidably adjustable along bars 134 by a hand-wheel, not shown, attached to shaft 135 connected by suitable gearing to the rods 136 which threadably engage the blocks 133. This adjustment is to accommodate blanks having various widths of bottom panel S5.

The rack 137 which continuously engages gear 138 on shaft 133 is guided by member 139 and is pivotally connected at its lower end to lever 140 pivoted at 127 and carrying a follower received by another cam groove 130 in aforesaid cam 128. The two grooves 129, 130, Fig. 6, in opposite faces of cam 128 are so shaped that the lower pair of tools 65, 65 complete bending of panel S2 of a blank against panel S5 in advance of bending of panel S1 by the upper pair of tools, 64, 64; the return movements of the pairs of tools 64, 65 may be effected concurrently.

The mechanism for arresting each blank for bending of its end panels S3, S4 and for centering it before operation thereon of the bending tools 74, 75 is shown most clearly in Figs. 14 to 19. This mechanism comprises two similar units 143R, 143L only one of which need be described in detail. The stop 72 is loosely pivoted on shaft 144 extending from bracket 145 on bell crank lever 146 pivoted at 147 to the base 148 adjustably secured to the conveyor frame 149 by bolt 150. To stop 72 is attached the dog 151 alternately engaged by stops 152, 153 extending from member 154 secured to bracket 155 of base 148. The centering tool 156 is adjustably secured to arm 146 provided with slot 157 for purpose of this adjustment to accommodate blanks of various overall lengths.

Arm 146 is pivotally connected to the movable core or armature 158 of a solenoid or electromagnet 159 whose energization is controlled by switch 84, Fig. 8, to effect movement of arm 146 from the position shown in Fig. 14 in opposition to the biasing spring 160. Movement of arm 146, in response to energization of solenoid 159, from the position shown in Fig. 18 to the position shown in Fig. 19, causes, because of coaction of stop 152 and dog 151, the stop 72 to be moved away from the path of movement of the blanks to the position shown in Figs. 17 and 19. Concurrently with this movement of the stops 72, the centering tools 156 shift the blank, if offset, to center it with its score lines u, v in alignment with the pivotal axes of tools 74, 75 respectively; compare Figs. 14 and 17.

After operation of the bending tools 74, 75 and release of the bent blank for movement with conveyor belts 71, the solenoids 159, under control of switch 84, are deenergized, whereupon springs 160 return the arms 146 to the positions shown in Fig. 14. During this return movement of each arm 146, its associated stop 72, because of coaction between dog 151 and stop 153, is swung from the position shown in Fig. 19 to the blank-arresting position shown in Fig. 18.

Movement of the plates 73, Figs. 4, 12, 13 and 21, which hold down a blank B during bending of its end panels S3, S4 is controlled by cam 161 secured to shaft 20 which, as previously stated, makes one revolution for each cycle of machine D. The groove of cam 161 receives a follower carried by one arm of bell crank lever 162, Fig. 21, whose other arm is connected by link 163, Figs. 12 and 21, to arm 164 attached to shaft 165. The arms 166 to the lower ends of which are pivotally mounted, Fig. 22, the holding tools 73, are attached at their upper ends to shaft 165, Fig. 13. Each of tools 73, biased by a spring 166A, Fig. 22, to position normal to the upper face of the blank and in alignment with a score line u or v, yields as previously explained in discussion of Figs. 4A, 4B during the bending of the blank. Cam 161 is so shaped and timed that plates 73 move downwardly to engage a blank arrested by stops 72, remain down during bending of panels S3, S4 of the blank by tools 74, 75, and thereafter return to their original position.

Preferably, at least during bending of its panels S3, S4, the blank is held by suction exerted through ports 167, Fig. 14, in the upper faces of the housing 168, Figs. 12, 13, 14, which serve as supports for bases 148 of units 143R, 143L and for the pulleys for conveyor belts 71. The housings 168 are connected by pipes 169, Figs. 6, 15 and 17, to suction chamber 170, Fig. 6, connected by pipe 171 to a suction pump or equivalent. The bleeder valve 172 for controlling the suction in chamber 170 is operated by cam 173 on shaft 94, Fig. 6, through the bell crank lever 174. Preferably, cam 173 is so shaped and timed that the suction goes on after a blank has been centered by tools 156 and subsequently engaged by tools 73 and remains on until after the bending tools 74, 75 have, in their return movement, moved sufficiently to clear the blank from which tools 73 have, in the meantime, been retracted.

The end-bending tool 75, Fig. 8, is attached to the forward end of shaft 172 to the rear end of which is attached gear 173A continuously in mesh with rack 174A, Fig. 5, pivotally connected to the lower end of arm 175 freely pivoted on pin 176 and carrying a cam follower received by a cam groove in one face of cam 177. The shaft 178 to which cam 177 is secured is driven from shaft 94 through miter gears 179. The other end-bending tool 74 is similarly operated from a cam groove in the opposite face of cam 177 through arm 175B, rack 174B, gear 173B and shaft 172B. The cam grooves are so cut that one of the tools, for example 75, begins its bending movement substantially before the other tool so to suit the machine to bending of a blank whose end panels are wider than half the length of bottom panel S5.

The bearings for shaft 172B are attached to one of the suction housings 168 and the bearings for shaft 172 are similarly attached to or form part of the other suction housing; each of housings 168 is slidable along the guide bars 180 and drive shaft 181 for the conveyor belts 71. The driving pulley 182 of each belt moves axially of shaft 181 as its associated housing 168 is moved and is maintained in driving engagement with shaft 181 by a long key or equivalent. Shaft 181 is continuously driven, Fig. 12, by chain 183 which passes over the driving sprocket on shaft 16, the driven sprocket on shaft 181, and an idler sprocket 186 on one of guide rods 180.

When the end-bending frames or housings 168 are to be adjusted, the tools 74, 75 are first loosened on their shafts and reclamped in proper position with respect thereto after the adjustment of the frames has been effected. The relations of the axes of rotation of shafts 172, 172A and their tools 75, 74 with respect to the score lines u, v have been previously herein discussed in connection with Fig. 4 and need not be repeated.

I disclaim all those methods and systems or apparatus, of and for assembly by an operator of wrappers with box blanks individually delivered to or adjacent the assembling station, disclosed and originally claimed herein and disclosed and claimed in co-pending application of John S. Stokes Serial No. 422,197, filed December 9, 1941.

What I claim is:

1. An arrangement for bending a blank along a score line defining adjacent panels comprising yieldingly mounted structure for engaging one face of one of said panels adjacent the score line, a rotatable bending tool for engaging the opposite face of the other of said panels and having its axis of rotation substantially in alignment with said score line, and means for rotating said tool about its axis to bend said one of said panels about said score line and to effect displacement of said structure as said one of said panels approaches face to face engagement with the other of said panels.

2. An arrangement for bending a blank along two score lines defining three panels comprising yieldingly mounted members for engaging one face of one of said panels adjacent said score lines, rotatable bending tools for engaging the other face of the other two of said panels and having their axes of rotation substantially in alignment with said score lines respectively, and means for actuating said tools to swing said last named two panels about said score lines and effect yielding of said members as said panels approach face to face engagement with the first named of said panels.

3. An arrangement for bending a blank along a score line defining adjacent panels comprising a member pivoted about an axis substantially parallel to said score line and biased to engage one of said panels adjacent said score line, and movable means for engaging the other of said panels and swinging it about said score line to engage and displace said member after substantial movement and finally to effect face to face engagement of said panels.

4. An arrangement for bending a blank along a score line defining adjacent panels comprising a member pivoted about an axis substantially parallel to said score line and biased to engage one of said panels adjacent said score line, a rotatable bending tool for engaging the other of said panels and having its axis of rotation substantially in alignment with said score line, and means for moving said tool about said axis first to effect engagement of the other of said panels with said member and upon yielding thereof to effect face to face engagement of said panels.

5. Mechanism for effecting intermittent advance of a box blank having end, side and bottom panels, bending means operable while the blank is at rest in one position to effect face to face engagement of end and bottom panels thereof, and bending means operable while the blank is at rest in another position to effect face to face engagement of side and bottom panels thereof.

6. Mechanism for effecting intermittent advance of a box blank having end, side and bottom panels, bending means operable while the blank is at rest in one position to effect face to face engagement of end and bottom panels thereof, bending means operable while the blank is at rest in another position to effect face to face engagement of side and bottom panels thereof, and means for exerting suction upon one of each of said pairs of panels during operation of said bending means.

7. An arrangement for bending a blank having a score line defining adjacent panels comprising a member engaging a face of one of said panels and through which suction is exerted, a member biased to engage the opposite face of said one of said panels along the score line, a rotatable bending tool for engaging the other of said panels, and means for operating said tool to swing said other of said panels about the score line into engagement with said member and thereafter toward face to face engagement with the said one of said panels during continued application of suction thereto and withdrawal of said biased member.

8. An arrangement for bending a blank having score lines defining the bottom panel and two panels adjacent thereto, rotatable bending tools having their axes of rotation parallel to each other, a conveyor for transporting the blank in direction substantially parallel to said axes, a stop for arresting the blank in position for operation thereon of said bending tools, and mechanism operable to shift the arrested blank to effect alignment of said score lines with said axes and thereafter to effect operation of said tools to bend said two panels toward face to face engagement with said bottom panel.

9. A pair of suction housings relatively adjustable toward and from each other, a pair of endless conveyors each supported by one of said adjustable housings to transport a box blank, a pair of rotatable bending tools each supported by one of said housings to bend a panel of said blank, means for operating said tools to bend panels of the blank into engagement with an intermediate panel, and suction control means effecting application of suction through said housings upon said intermediate panel during aforesaid operation of said bending tools.

10. Mechanism for feeding a blank having score lines defining end, side and bottom panels, rotatable bending tools along the path of movement of said blank having their axes of rotation normal to and parallel with said path respectively, stop structure in said path for arresting the blank with said score lines in alignment with the axes of rotation of said tools, and means for actuating said tools in succession to bend the end and side panels of the arrested blank into face to face engagement with the bottom panel thereof.

THEODORE A. FEDERWITZ.